United States Patent [19]
Chlumsky et al.

[11] Patent Number: 4,772,205
[45] Date of Patent: Sep. 20, 1988

[54] TACTILE BRAILLE OR GRAPHIC DISPLAY

[75] Inventors: Lubomir Chlumsky; Leopold Hellinger; Christian Kauer, all of Vienna, Austria

[73] Assignee: Siemens Aktiengesellschaft, Berlin & Munich, Fed. Rep. of Germany

[21] Appl. No.: 41,215

[22] Filed: Apr. 22, 1987

[30] Foreign Application Priority Data

May 6, 1986 [AT] Austria .................................. 1211/86

[51] Int. Cl.$^4$ ............................................. G09B 21/02
[52] U.S. Cl. .................................... 434/114; 340/407
[58] Field of Search ................. 434/113, 114; 340/407

[56] References Cited

U.S. PATENT DOCUMENTS

| 3,987,438 | 10/1976 | Lindenm/eller | 434/114 |
| 4,178,586 | 12/1979 | Schönherr | 340/407 |
| 4,191,945 | 3/1980 | Hannen et al. | 340/407 |
| 4,194,190 | 3/1980 | Bareau | 340/407 |
| 4,586,904 | 5/1986 | Chlumsky | 434/114 |

FOREIGN PATENT DOCUMENTS 2608659  9/1977  Fed. Rep. of Germany .

OTHER PUBLICATIONS

IBM Technical Disclosure Bulletin (vol. 15, No. 2, Jul. 1972), "Reader for the Blind", E. S. Pearson, pp. 397–398.

Primary Examiner—Richard J. Apley
Assistant Examiner—J. Welsh
Attorney, Agent, or Firm—Hill, Van Santen, Steadman & Simpson

[57] ABSTRACT

A tactile braille or graphic display with a laminar display carrier with pattern points which are raised in their tangible positions and are formed by the hemispherical surfaces of feeler balls projecting through openings in the top of the display carrier which feeler balls are selectively brought into their tangible position by adjustment of associated locking balls. A locking armature which can be slid into the underside of the display carrier is provided to adjust each locking ball. This armature can firstly be slid into the locking position by means of a setting armature of a moving setting device and secondly can be released from the locking position by the setting armature after the latter is magnetized. The locking ball is spring-loaded and in the locking position is moved under the feeler ball against the pressure of the spring by the locking armature in order to hold the feeler ball in its tangible position, and preferably a further filling ball serving as a spacer is disposed between the feeler ball and the locking ball. The locking armature is provided with a shoulder which partially grips around the locking ball in the locking position, producing an easily releasable clamping connection, and holds the locking armature in the locking position. The setting armatures for a plurality of pattern points, in particular for the pattern points of a line of shapes, are disposed together with their magnetizing windings on a common setting device which is disposed so as to be displaceable at right angles to the direction of the line of shapes on rails provided at both sides of the display carrier and is adjustable in relation to the display carrier with the aid of eccentrics for the purpose of adjusting the tangible positions of the pattern points of this line of shapes.

9 Claims, 1 Drawing Sheet

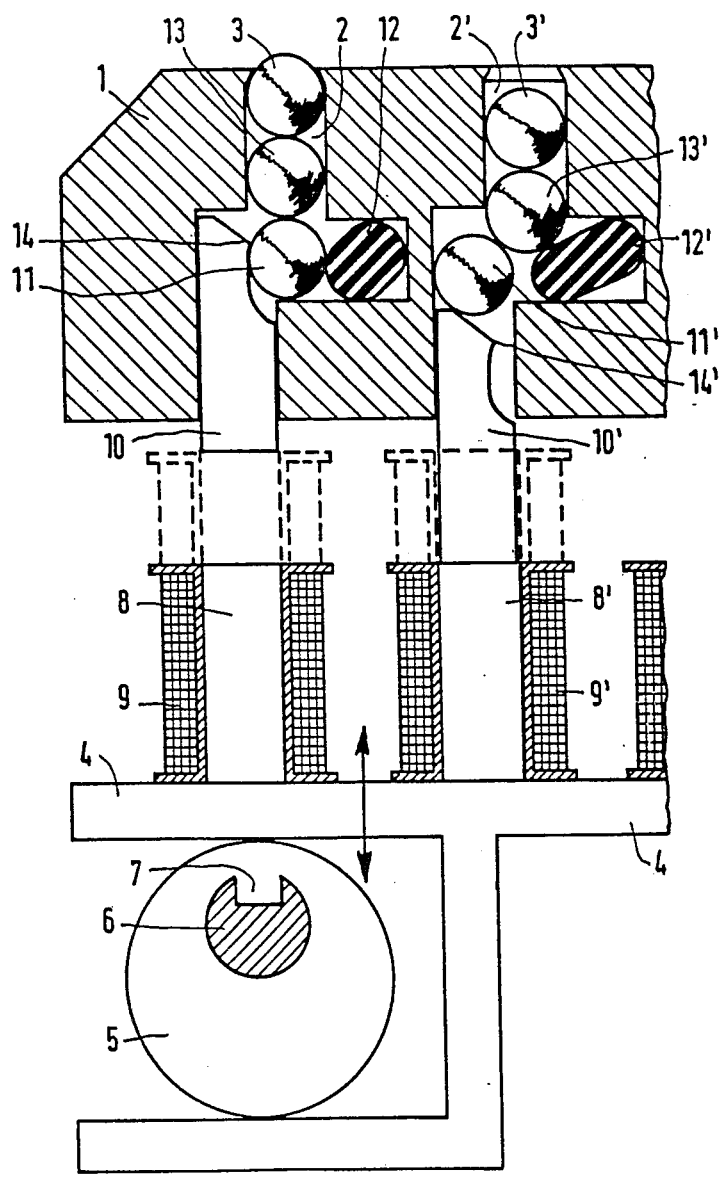

TACTILE BRAILLE OR GRAPHIC DISPLAY

BACKGROUND OF THE INVENTION

1. Field of the Invention

The invention relates to a tactile braille or graphic display with a laminar display carrier with pattern points which are raised in their tangible positions and are formed by the hemispherical surfaces of feeler balls projecting through openings in the top of the display carrier, which balls are selectively brought into the tangible position by adjusting associated locking elements.

2. Description of the Prior Art

Braille's type for the blind is composed of letters or characters which consist of combinations of either six or eight tangible pattern points disposed under or next to one another, and the pattern is also characterized by varied spacing of the pattern points. These combinations are usually described as "shapes". A braille pattern spacing of approximately 3 mm is suitable for braille type output devices with feeler buttons.

Electromagnetic output devices for braille type are known which are provided with a panel which exhibits a pattern of holes with the basic structure of the braille characters. These holes accomodate pins which can be moved upwards individually by means of electromagnets such that the externally projecting pins as a whole represent the braille characters. In one of these known embodiments the externally projecting ends of the pins are hemispherical. All these known embodiments of reading devices serve for presentation of a text in chunks determined by the size of the display field. When a fairly lengthy text is to be displayed in a tangible form with the aid of such devices, this text must be broken up into sections according to the size of the recording field and stored and this stored data is then converted into electrical signals.

U.S. Pat. No. 3,987,438 describes a braille type output device in which each feeler button has two magnets which are disposed one under the other in the axial direction at least and at least one of which takes the form of an electromagnet. When energized electrically the magnets produce a force in the axial direction of the feeler button. This force lifts or lowers the feeler button by means of a magnetic coil depending on the direction of energization. Each feeler button is provided with a mechanical magnetically controllable locking device which only acts on the feeler button. Here the drawback is the large number of mechanical components required to produce a plurality of buttons when this is used for a graphic display.

German OS No. 26 08 659 also describes a braille type output device in which the feeler pins in the form of permanent magnets are provided to represent the tangible points, which feeler pins are displaceable by means of one or two associated, also permanently magnetic carrier pins. The feeler and carrier pins are arranged in rows with unlike poles adjacent one another and the feeler pins are displaced in their longitudinal direction by magnetically tripped tilting movements of the carrier pins. During the constant alternating magnetic action on the carrier pins there is a risk of demagnetization and thus impairment of correct operation.

SUMMARY OF THE INVENTION

An underlying object of the invention is to create a laminar display carrier for a braille type output device which allows both multi-line braille type display and graphics display and in which the pattern points are locked securely in their tangible positions so that (the braille type or graphics) can be copied with simple means. In addition, this display carrier is also designed to perform the functions which a visual display unit normally performs in electronic data processing systems, for example displaying a separate line (editing line) for programming and interrogation purposes.

This object is achieved by the invention in that a locking armature which can be slid into the underside of the display carrier is provided to adjust each locking element, which locking armature can firstly be slid into the locking position by means of a setting armature of a moving setting device and secondly can be released from the locking position by the setting armature after the setting armature is magnetized.

One particularly simple practical solution is obtained when the locking element takes the form of a spring-loaded locking ball which is moved under the feeler ball by the locking armature against the pressure of the spring into the locking position in order to hold the feeler ball in its tangible position, and when a further filling ball serving as a spacer is disposed between the feeler ball and the locking ball.

In order to fix the locking armature in its locking position it is expedient when the locking armature is provided with a shoulder which partially grips around the locking ball in the locking position and forms an easily releasable clamping connection.

In accordance with further features of the invention the setting armatures for a plurality of pattern points, in particular for the pattern points of a line of shapes, are disposed on a common setting device together with their magnetizing windings, and the setting device provided for a line of shapes is disposed so as to be displaceable at right angles to the direction of the line of shapes on rails provided at both sides of the display carrier and is adjustable in relation to the display carrier with the aid of eccentrics for the purpose of adjusting the tangible positions of the pattern points of this line of shapes.

It is expedient to mount the eccentrics so that the are slidable on the rails but prevented from turning relative to the rails by means of a longitudinal groove.

BRIEF DESCRIPTION OF THE DRAWINGS

As an example of the embodiment of the invention, the drawing shows a section through one braille type display.

DESCRIPTION OF THE PREFERRED EMBODIMENTS

In each pattern location a display carrier 1 is provided with a chamber which accomodates three balls. Two of these chambers are shown in the FIGURE. Each chamber includes a ball channel 2,2' which extends to the upper surface of the display carrier 1 and the upper opening of which is somewhat narrower in order to prevent the balls from escaping. The topmost of these balls serves as the feeler ball 3,3', the upper hemispherical surface of which projects from the opening in the ball channel 2,2' in its tangible position. In the illustration the feeler ball 3 is in its tangible position whereas the feeler ball 3' is lowered.

The feeler balls 3,3' of a line of shapes are simultaneously moved into position with the aid of a setting device 4 which takes the form of a carriage which can be raised and lowered with the aid of two eccentrics 5, only one of which is visible in the drawing. The eccentrics 5 are disposed so as to be displaceable with the setting device 4 at right angles to the direction of the line of shapes, along two rails 6 provided at both sides of the carrier 1. The rails 6, of which again only one is visible, are constituted by cylindrical rods which are provided with a longitudinal groove 7 and are disposed so that they can be rotated about their longitudinal axis. The longitudinal groove 7 ensures that the rotation is transferred from the rails 6 to the eccentrics 5. A setting armature 8,8' is provided on the setting device 4 for every pattern point of the line of shapes. The setting armatures 8,8' are made of a magnetizible material and are each provided with a magnetizing winding 9,9' by means of which they can be magnetized individually.

The feeler balls 3,3' of a line of shapes are set as follows. The setting device 4 is first positioned under this shape line and then raised with the setting armatures 8,8'. The positions of the setting armatures 8,8' in the raised position are indicated by broken lines. In this position the setting armatures 8,8' push the locking armatures 10,10' associated with the individual pattern points upwards and in turn by means of their bevelled upper end faces these locking armatures move associated locking elements in the form of locking balls 11,11' sideways against the pressure of a resilient rubber bead 12,12'. Above each of the locking balls 11,11' there is a further ball 13,13' which acts as a filling ball, serving as a spacer between the locking ball 11,11' and the feeler ball 3,3'. The presence of the filling balls 13,13' is not absolutely essential but it is advantageous for transmission of the forces between the first mentioned balls.

When all the feeler balls 3,3' of the line of shapes in question have been brought into their uppermost position, an electrical control circuit (which is not shown) causes the energization of the magnetizing windings 9,9' of those setting armatures 8,8' whose associated feeler balls 3,3' are not supposed to remain in the tangible position, whereupon the setting device 4 is lowered again with the setting armatures 8,8'. When this is done, the locking armatures 10,10' which were in contact with the energized setting armatures 8,8' are also pulled downwards by the magnetic force.

This also results in the associated locking ball 11,11' being pressed out of the locking position by the associated rubber bead 12,12', whereupon the filling ball 13,13' lying above it is lowered with the associated feeler ball 3,3'.

The locking armature, for example the locking armature 10, the associated setting armature 8 of which was not energized when the setting device 4 was lowered remains in its locking position because it is provided with a shoulder 14 which partially grasps the locking ball 11 and prevents the locking armature 10 descending through its own weight. However, if the associated magnet armature 8 were energized, the magnetic force exerted would be sufficient for the locking armature 10 to be pulled down and for the shoulder 14 to press the locking ball 11 against the rubber bead 12 sufficiently to ensure that the further downward movement of the locking armature 10 was not prevented. It must also be pointed out that the locking armatures 10,10' are each provided with a stop (which is not shown in the drawing) which prevents the locking armatures 10,10' dropping out of the display carrier 1 through their own weight.

Correct actuation of the locking armatures 10,10' is only guaranteed if all the setting armatures 8,8' make good mechanical contact with their associated locking armatures 10,10' in their raised position so that the required magnetic force can act in the event of magnetization. In order to ensure this, the dimensions of the chamber provided for the locking armatures is such that in their uppermost position they still have sufficient play for a surplus movement as shown in the case of locking armature 10.

The characters (shapes or graphic displays) on the display carrier 1 are copied as follows. A sheet of stronger typing paper is placed on the display carrier 1, run over with a rubber roller and thus pressed against the pattern points. When this happens, the feeler balls 3 set in their tangible positions leave permanent marks in the typing paper which are tangible with the same resolving power as the feeler balls themselves. However, this kind of copying process makes it necessary for the feeler balls to be locked securely; this is guaranteed by the particular construction of the display in accordance with the invention as described above.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A tactile braille or graphic display comprising:
   a laminar display carrier having a plurality of openings in a top surface thereof;
   a plurality of display elements having a hemispherical upper surface movable within said display carrier to selectively project said hemispherical surface through said openings in a tangible position;
   a plurality of locking elements for moving said display elements into said tangible position;
   a locking armature slidable into the underside of said display carrier to adjust each locking element against resilient pressure;
   a movable setting device including a setting armature and a magnetizing winding;
   said locking armature being firstly slidable into a locking position by means of said setting armature which is moved by a mechanical means and being secondly movable out of the locking position by said setting armature after said setting armature is magnetized.

2. A display according to claim 1, wherein said locking element is a spring-loaded locking ball which is moved under the feeler ball by the locking armature against a spring pressure in the locking position in order to hold the feeler ball in its tangible position.

3. A display according to claim 1, wherein a further filling ball serving as a spacer is disposed between the feeler ball and the locking ball.

4. A display according to claim 1, wherein the locking armature is provided with a shoulder which partially grips around the locking ball in the locking position, forming an easily releasable clamping connection.

5. A display according to claim 1, wherein the setting armatures for a plurality of pattern points, in particular for the pattern points of a line of shapes, are disposed together with their magnetizing windings on a common setting device.

6. A display according to claim 5, wherein the setting device provided for a line of shapes is disposed so as to be displaceable at right angles to the direction of the line of shapes on rails provided at both sides of the display carrier and is adjustable in relation to the display carrier with the aid of eccentrics for the purpose of adjusting the tangible positions of the pattern points of this line of shapes.

7. A display according to claim 6, wherein the eccentrics are disposed so as to be slidable on the rails but are prevented from rotating in relation to the rails by means of a longitudinal groove.

8. A display according to claim 1, wherein said display elements comprise feeler balls.

9. A tactile braille or graphic display comprising:
a laminar display carrier having a plurality of openings in a top surface thereof;
a plurality of feeler balls movable within said display carrier to selectively project an upper hemispherical surface through said openings in a tangible position;
a plurality of locking elements comprising spring loaded locking balls for moving said display elements into said tangible position;
a locking armature slidable into the underside of said display carrier to adjust each locking element by moving the locking ball under the feeler ball against a spring pressure in the locking position in order to hold the feeler ball in its tangible position;
said locking armature being provided with a shoulder which partially grips around the locking ball in the locking position, forming an easily releasable clamping connection;
a further filling ball functioning as a spacer between each feeler ball and locking ball;
a moving setting device including a setting armature and a magnetizing winding;
said locking armature being firstly slidable into a locking position by means of said setting armature which is moved by a mechanical means and being secondly movable out of the locking position by said setting armature after said setting armatur is magnetized.

* * * * *